US012023570B2

(12) United States Patent
Blotiau

(10) Patent No.: US 12,023,570 B2
(45) Date of Patent: Jul. 2, 2024

(54) DEVICES AND METHODS FOR REMOVING WAX FROM FLAT AND CURVED SURFACES

(71) Applicant: Christopher Sebastian Blotiau, Montauk, NY (US)

(72) Inventor: Christopher Sebastian Blotiau, Montauk, NY (US)

( * ) Notice: Subject to any disclaimer, the term of this patent is extended or adjusted under 35 U.S.C. 154(b) by 21 days.

(21) Appl. No.: 17/655,105

(22) Filed: Mar. 16, 2022

(65) Prior Publication Data

US 2023/0293969 A1 Sep. 21, 2023

(51) Int. Cl.

*A63C 11/08* (2006.01)
*A47L 13/02* (2006.01)
*B08B 1/16* (2024.01)

(52) U.S. Cl.

CPC .............. *A63C 11/08* (2013.01); *A47L 13/02* (2013.01); *B08B 1/165* (2024.01)

(58) Field of Classification Search

None
See application file for complete search history.

(56) References Cited

U.S. PATENT DOCUMENTS

| | | | | | |
|---|---|---|---|---|---|
| 1,388,282 | A | * | 8/1921 | Meredith | A47L 17/06 15/245 |
| 3,676,888 | A | | 7/1972 | Akers | |
| D332,160 | S | * | 12/1992 | Kuzma | D7/688 |
| D349,592 | S | * | 8/1994 | Stoll | 15/236.08 |
| 5,418,998 | A | * | 5/1995 | Smarra | A47L 1/16 15/245 |
| D364,719 | S | * | 11/1995 | Crawford | D8/15 |
| D388,569 | S | | 12/1997 | Israel | |
| 6,079,500 | A | * | 6/2000 | Kenney | A01L 11/00 15/236.08 |
| D450,556 | S | | 11/2001 | Biller et al. | |
| 6,546,589 | B1 | | 4/2003 | Job | |
| D502,580 | S | | 3/2005 | Williams | |
| 7,225,848 | B2 | * | 6/2007 | Williams | B29C 63/0047 156/574 |
| 7,694,381 | B2 | | 4/2010 | Heaslet | |
| 9,067,655 | B1 | * | 6/2015 | Fusco | A46B 3/00 |
| D841,271 | S | * | 2/2019 | Motsenbocker | D32/46 |
| 2005/0034264 | A1 | | 2/2005 | Shioyama et al. | |
| 2007/0277336 | A1 | * | 12/2007 | Heaslet | A63C 11/08 15/236.08 |
| 2008/0193192 | A1 | * | 8/2008 | Zulian | A63C 11/08 401/52 |

(Continued)

OTHER PUBLICATIONS

"John's Channel, Dewaxing Your Surfboard, May 5, 2020, "https://www.youtube.com/watch?v=nf91RsSrMgo"" (Year: 2020).*

(Continued)

*Primary Examiner* — Laura C Guidotti
*Assistant Examiner* — Dana Lee Poon
(74) *Attorney, Agent, or Firm* — Fox Rothschild LLP

(57) ABSTRACT

Devices and methods are provided for removing wax from surfaces, such as the exterior surfaces of surfboards. The devices are configured to be sufficiently stiff remove hardened wax, while being soft and pliable enough to avoid scratching or otherwise damaging the underlying surfaces, and to permit the devices to conform to contours and curves on the surfaces.

12 Claims, 3 Drawing Sheets

(56) References Cited

U.S. PATENT DOCUMENTS

| | | | | |
|---|---|---|---|---|
| 2008/0216260 | A1 | 9/2008 | Silverman et al. | |
| 2011/0045752 | A1 * | 2/2011 | Carroll .................. | A63C 11/08<br>451/461 |

OTHER PUBLICATIONS

Dakine, Dakine Triangle Scraper—Green—Snowboard & Ski Tools, Dec. 3, 2017, "https://www.amazon.com/Dakine-Triangle-Scraper-Green-Size/dp/B073G81Q6S/ref=sr_1_7?crid=3KR0JRXUYK2A&keywords=triangle+scraper+surfboard&qid=1687562041&sprefix=triangle+scraper+surfboard%2Caps%2C85&sr=8-7" (Year: 2017).*

* cited by examiner

DEVICES AND METHODS FOR REMOVING WAX FROM FLAT AND CURVED SURFACES

FIELD

The present technology relates to devices and methods for removing wax from flat and curved surfaces, such as the exterior surfaces of surfboards.

BACKGROUND

Surfboards typically are coated with a layer of wax. The wax has a tackiness that provides grip and traction to the feet of the surfer, which are necessary for the surfer to remain on and in control of the surfboard. Over time, the wax hardens and loses its tackiness. The old wax can be scuffed to regain some its tackiness. At some point, however, further scuffing will not return the wax to a state of sufficient tackiness, necessitating the application of new wax. Because the old wax adds weight to the surfboard and can adversely affect the ability of the new wax to adhere to the surfboard, the old wax needs to be removed before the new wax is applied.

Used wax typically is removed from surfboards using a tool referred to as a surf comb or wax comb. FIG. 6 depicts an illustrative wax comb 100. The wax comb 100 has a thin, straight, beveled edge or blade 102 on one side; and comb-like teeth or tines 104 on the opposite side. The teeth 104 typically are used to scuff the wax, and the blade 102 is used for wax removal. To remove the wax, the user holds the blade 102 against the wax at an angle and exerts downward and forward pressure on the opposite side of the wax comb. The blade 102 penetrates the wax layer, and then slides along the surface of the surfboard, scraping the overlying wax from the surface.

To provide the wax comb 100 with sufficient strength and structural integrity to remove the relatively hard used wax, the wax comb 100 typically is formed from a relatively hard plastic with little or no flexibility or resilience. Thus, the blade 102 cannot bend or flex substantially to follow the curves and contours of the underlying surface of the surfboard. Because the surface of a typical surfboard has many curves and contours, the user often must make multiples passes over the same places on the surface to effectively remove the old wax. Also, the thin, inflexible blade 102 is prone to becoming chipped, dinged, or dented when it encounters hard objects, such as small pebbles embedded in the wax, making the wax comb 100 less effective and limiting its service life. And the rigid blade 102 can damage the glossy coating on the surface of surfboard, and the surfboard's underlying fiberglass shell. Moreover, the inflexible plastic material is not well suited to withstand years of hard use, aggressive handling, and being dropped repeatedly. And from an ergonomic standpoint, the hard plastic can be uncomfortable to handle during hours of use, and the teeth 104 on the side of the wax comb 100 opposite the blade 102 can dig into, irritate, and injure the hand of the user as the user pushes the wax comb 100 across the surfboard during the wax removal process.

SUMMARY

In one aspect of the disclosed technology, a method for removing wax from a surface of a surfboard includes providing a wax removing device having a body formed from a polyurethane rubber material having a hardness between about Shore 70 A and about Shore 90 A. The body includes a top surface, a bottom surface, and a side surface having a first edge adjoining the top surface, and a second edge adjoining the lower surface. The method also includes placing the second edge of the side surface in contact with the wax; tilting the body in relation to the surface of the surfboard; and exerting downward pressure on the body while moving the body along the surface of the surfboard.

In another aspect of the disclosed technology, exerting downward pressure on the body while moving the body along the surface of the surfboard includes exerting sufficient downward pressure on the body to maintain the body in contact with the surface of the surfboard.

In another aspect of the disclosed technology, exerting sufficient downward pressure on the body to maintain the body in contact with the surface of the surfboard includes exerting sufficient downward pressure on the body to maintain the body in contact with curved or contoured portions of the surface of the surfboard.

In another aspect of the disclosed technology, exerting sufficient downward pressure on the body to maintain the body in contact with curved or contoured portions of the surface of the surfboard includes exerting sufficient downward pressure on the body to flex the body over the curved or contoured portions of the surface of the surfboard.

In another aspect of the disclosed technology, exerting sufficient downward pressure on the body to maintain the body in contact with curved or contoured portions of the surface of the surfboard includes exerting sufficient downward pressure on the body to conform a portion of the body to a shape of the curved or contoured portions of the surface of the surfboard.

In another aspect of the disclosed technology, placing the second edge of the side surface in contact with the wax includes placing the second edge of the side surface in contact with the wax so that the bottom surface of the body faces the surface of the surfboard; and tilting the body in relation to the surface of the surfboard includes angling the bottom surface of the body in relation to the surface of the surfboard.

In another aspect of the disclosed technology, angling the bottom surface of the body in relation to the surface of the surfboard includes angling the bottom surface of the body in relation to the surface of the surfboard by about 45 degrees.

In another aspect of the disclosed technology, exerting downward pressure on the body while moving the body along the surface of the surfboard includes exerting sufficient forward and downward pressure on the body to cause the body to peel the wax from the surface of the surfboard.

In another aspect of the disclosed technology, the side surface of the body is substantially flat; and placing the second edge of the body in contact with the wax includes placing the second edge of the body in contact with the wax on a substantially flat portion of the surface of the surfboard.

In another aspect of the disclosed technology, the side surface of the body is curved inwardly, toward the body; and placing the second edge of the body in contact with the wax includes placing the second edge of the body in contact with the wax on a curved or contoured portion of the surface of the surfboard.

In another aspect of the disclosed technology, the polyurethane rubber material has hardness of about Shore 90 A.

In another aspect of the disclosed technology, the side surface is a first side surface; the first edge of the first side surface adjoins the top surface at an angle of about 90 degrees; and the second edge of the first side surface adjoins the top surface at an angle of about 90 degrees. The body further includes a second side surface having a first edge adjoining the top surface at angle of about 90 degrees, a second edge adjoining the lower surface at an angle of about 90 degrees, and a third edge adjoining the first side surface. The body further includes a third side surface having a first edge adjoining the top surface at angle of about 90 degrees, a second edge adjoining the lower surface at an angle of about 90 degrees, and a third edge adjoining the first and second side surfaces.

In another aspect of the disclosed technology, the top and bottom surfaces are separated by a distance of about ⅜ inch to about ½ inch.

In another aspect of the disclosed technology, the first and second side surfaces are substantially planar, and the third side surface is curved inwardly, toward the body.

In another aspect of the disclosed technology, a distance between the first and second edges of the side surface is about ⅜ inch to about ½ inch.

In another aspect of the disclosed technology, a device for removing wax from a surface of a surfboard includes a body. The body has a top surface, a bottom surface, and a side surface having a first edge adjoining the top surface at angle of about 90 degrees, and a second edge adjoining the lower surface at an angle of about 90 degrees. A distance between the first and second edges of the side surfaces is about ⅜ inch to about ½ inch. The body is formed from a polyurethane rubber material having a hardness between about Shore 70A and about Shore 90 A.

In another aspect of the disclosed technology, the polyurethane rubber material has hardness of about Shore 90 A.

In another aspect of the disclosed technology, the side surface is a first side surface. The body further includes a second side surface having a first edge adjoining the top surface at angle of about 90 degrees, a second edge adjoining the lower surface at an angle of about 90 degrees, and a third edge adjoining the first side surface. The body also includes a third side surface having a first edge adjoining the top surface at angle of about 90 degrees, a second edge adjoining the lower surface at an angle of about 90 degrees, and a third edge adjoining the first and second side surfaces.

In another aspect of the disclosed technology, the top and bottom surfaces are separated by a distance of about ⅜ inch to about ½ inch.

In another aspect of the disclosed technology, the first and second side surfaces are substantially planar, and the third side surface is curved inwardly, toward the body.

In another aspect of the disclosed technology, a method for removing wax from a surface of an object includes providing a wax removing device that includes a body formed from a polyurethane rubber material having a hardness between about Shore 70 A and about Shore 90 A. The body has a top surface, a bottom surface, and a side surface having a first edge adjoining the top surface, and a second edge adjoining the lower surface. The method further includes placing the second edge of the side surface in contact with the wax; angling the body in relation to the surface of the object; and exerting downward pressure on the body while moving the body along the surface of the object.

In another aspect of the disclosed technology, exerting downward pressure on the body while moving the body along the surface of the object includes exerting sufficient downward pressure on the body to maintain the body in contact with the surface of the object.

In one aspect of the disclosed technology, a method for removing wax from a surface of a surfboard includes providing a wax removing device having a body formed from a polyurethane rubber material. The body includes a top surface, a bottom surface, and a side surface having a first edge adjoining the top surface, and a second edge adjoining the lower surface. The method also includes placing the second edge of the side surface in contact with the wax; tilting the body in relation to the surface of the surfboard; and exerting downward pressure on the body while moving the body along the surface of the surfboard.

BRIEF DESCRIPTION OF THE DRAWINGS

The accompanying drawings, which are incorporated herein and constitute part of this specification, are illustrative of particular embodiments of the present disclosure and do not limit the scope of the present disclosure. The drawings are not to scale and are intended for use in conjunction with the explanations in the following detailed description.

DETAILED DESCRIPTION

Figure 1:
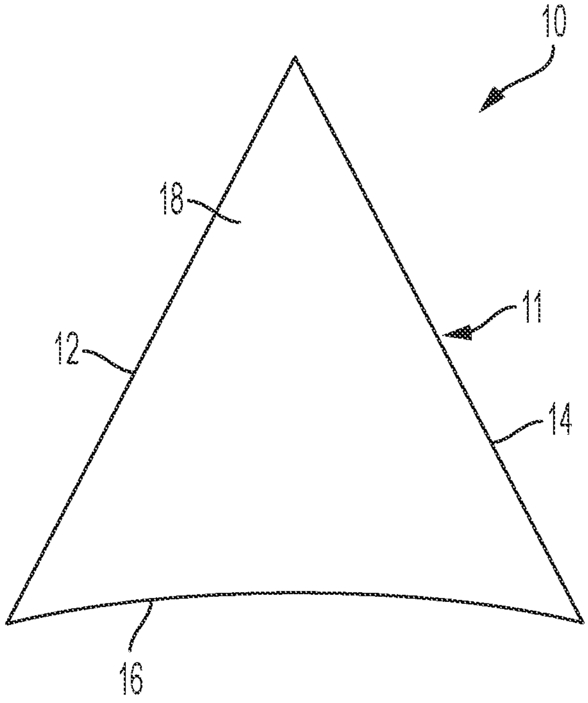
FIG. 1 is a top view of a device for removing wax from curved and contoured surfaces.

The following discussion omits or only briefly describes conventional features of the disclosed technology that are apparent to those skilled in the art. It is noted that various embodiments are described in detail with reference to the drawings, in which like reference numerals represent like parts and assemblies throughout the several views. Reference to various embodiments does not limit the scope of the claims appended hereto. Additionally, any examples set forth in this specification are intended to be non-limiting and merely set forth some of the many possible embodiments for the appended claims Further, particular features described herein can be used in combination with other described features in each of the various possible combinations and permutations.

FIGS. 1-5 depict a device 10 for removing wax from surfaces, such as an exterior surface 32 of a surfboard 34. The device 10 is configured to be sufficiently stiff remove hardened wax, while being soft and pliable enough to avoid scratching or otherwise damaging the underlying surface 32, and to permit the device to conform to contours and curves on the surface 32. The device 10 comprises a body 11 having a three-sided configuration. More specifically, the body 11 has a first side surface 12, a second side surface 14 that adjoins the first side surface 12, and a third side surface 16 that adjoins the first and second side surfaces 12, 14. The body 11 also includes a substantially planar top surface 18 that adjoins the first, second, and third side surfaces 12, 14, 16. The body 11 likewise includes a substantially planar bottom surface 20 that adjoins the first, second, and third side surfaces 12, 14, 16.

The first and second side surfaces 12, 14 are substantially planar. The third side surface 16 is slightly concave, and curves inward, toward the interior of the body 11, between the end points of the side surface 16.

Figure 2:
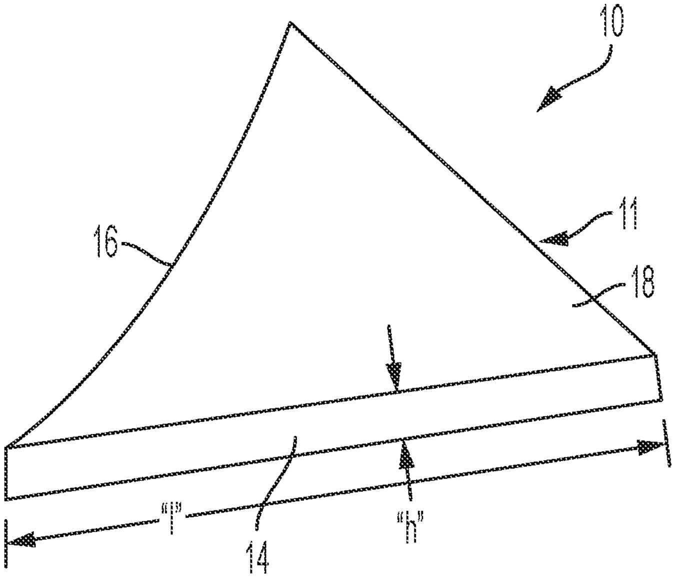
FIG. 2 is a top perspective view of the device shown in FIG. 1.
Figure 3:
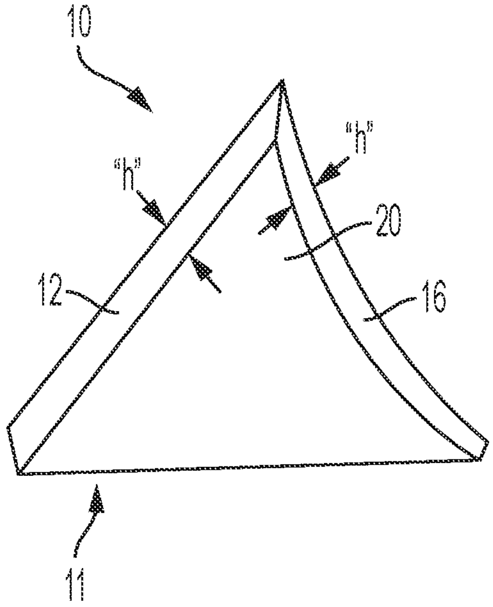
FIG. 3 is a bottom perspective view of the device shown in FIGS. 1 and 2.

The first, second, and third side surfaces 12, 14, 16 each have a height designed in FIGS. 2 and 3 by the character "h." The respective heights of the first, second, and third side surfaces 12, 14, 16 are approximately equal. Each of the first, second, and third side surfaces 12, 14, 16 adjoins the top surface 18 and the bottom surface 20 at an angle of about 90 degrees. The first, second, and third side surfaces 12, 14, 16, therefore, are substantially perpendicular to the top surface 18 and the bottom surface 20. And the body 11 has a substantially uniform thickness defined by the respective heights of the first, second, and third side surfaces 12, 14, 16. The thickness of the body 11 can be, for example, about ⅜-inch to about ½-inch.

The first, second, and third side surfaces 12, 14, 16 each have a length designed in FIG. 2 by the character "h." The respective lengths of the first, second, and third side surfaces 12, 14, 16 are approximately equal. Thus, the body 11, as viewed from above as shown in FIG. 1, has a shape approximately matching that of an equilateral triangle. In some embodiments, the respective lengths of the first, second, and third side surfaces 12, 14, 16 are, for example, about four inches to about six inches. In some embodiments, the respective lengths of the first, second, and third side surfaces 12, 14, 16 are, for example, about four inches. Alternative embodiments of the body 11 can have additional side surfaces, giving the alternative embodiments shapes other than triangular. For example, some alternative embodiments of the body 11 can have four side surfaces, giving such embodiments a square or rectangular shape.

The body 11 can be formed from polyurethane rubber material. In some embodiments, the polyurethane rubber material has a hardness, for example, between about Shore 70 A and about Shore 90 A, as measured on a Shore A durometer scale. In some embodiments, the polyurethane rubber material has a hardness, for example, of about Shore 90 A, as measured on a Shore A durometer scale.

Figure 4:
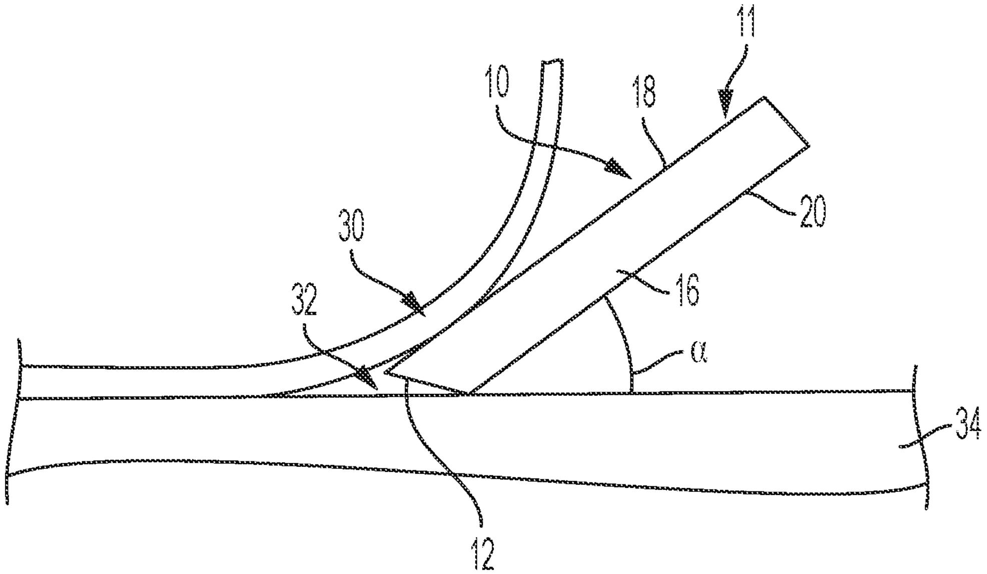
FIG. 4 is a side view of the device shown in FIGS. 1-3, depicting the device removing a layer of wax from substantially flat surface of a surfboard.
Figure 5:
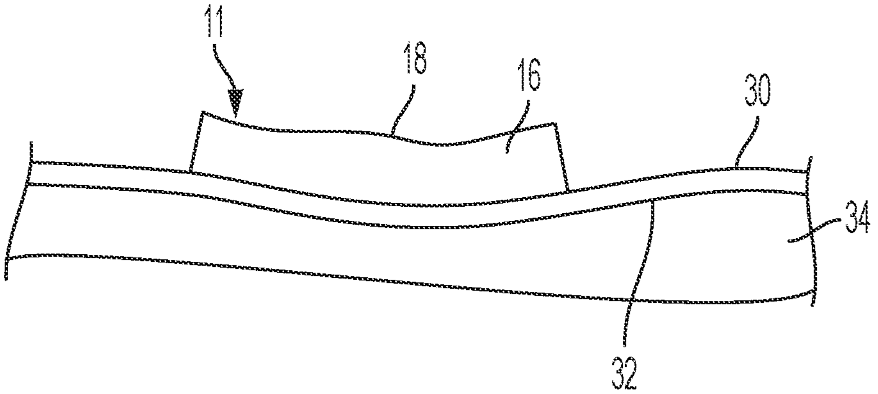
FIG. 5 is a front view of the device shown in FIGS. 1-4, depicting the device removing the layer of wax from a contoured surface of the surfboard.
Figure 6:
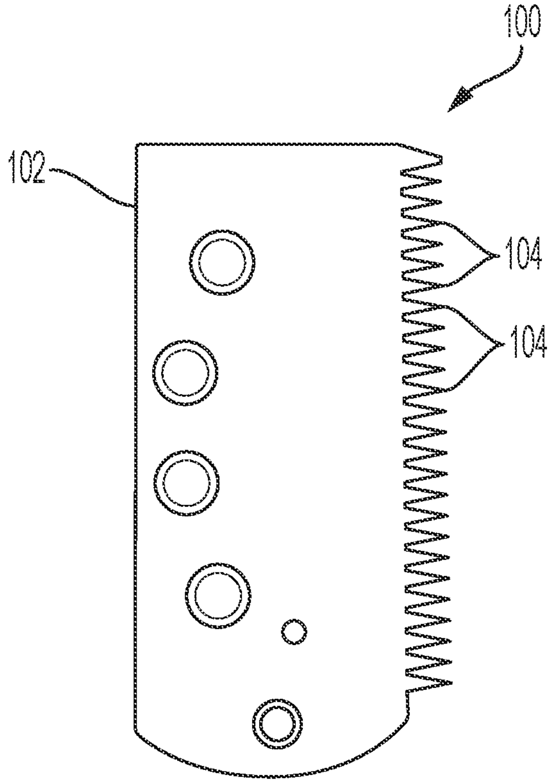
FIG. 6 PRIOR ART
FIG. 6 is a top view of a prior-art wax comb.

The wax removal device 10 can be used to remove a layer of wax 30 from an exterior surface 32 of a surfboard 34 as follows. The way layer 30 and the underlying surface 32 are depicted in FIGS. 4 and 5. The substantially flat first and second side surfaces 12, 14 can be used to remove the wax layer 30 on flat, and slightly curved or contoured surfaces 32 of the surfboard 34, as shown in the side view of the device FIG. 4. The curved third side surface 16 can be used to remove the wax layer 30 located on more sharply curved or contoured surfaces, such as the rails of the surfboard 34, as shown in FIG. 5.

For purposes of illustration, the device 10 is described herein as removing the wax layer 30 using the first surface 12 of the body 11. Referring to FIG. 4, to remove the wax layer 30 using the first surface 12, the user grasps the device 10 in one hand, and positions the lower lengthwise edge of the first side surface 12 on the wax layer 30 on the exterior surface 32 of the surfboard 34. The user orients or tilts the body 11 so that first side surface 12, and the adjoining top and bottom surfaces 18, 20, are angled forwardly, as shown in FIG. 4, in relation to the exterior surface 32. For example, the user can tilt the body 11 so that the angle between the exterior surface 32 and the bottom surface 20 is about 45 degrees. The angle between the exterior surface 32 and the bottom surface 20 is denoted in FIG. 4 by the character "$\alpha$".

The user then exerts forward and downward pressure on the body 11, initially causing the body 11 to slide over the wax layer 30. The elasticity of the polyurethane rubber material from which the body 11 is formed permits the body 11 to deform in response to the forward and downward pressure thereon, in combination with the rearward-acting frictional force exerted on the body 11 by the contacting surface of the wax layer 30. Although the body 11 can flex, the thickness of the body 11 and the moderate hardness of the polyurethane rubber material give the body 11 sufficient stiffness to penetrate the relatively hard wax layer 30, and to strip or peel the wax layer 30 from the surface 32 as the body 11 slides over the surface 32 after penetrating the wax layer 30. Applicant has found that, once the body 11 has penetrated the wax layer 30, the continued application of forward and downward pressure on the angled body 11 can cause the wax layer 30 to be peeled off the surface 32 in a continuous piece as the user pushes the body 11 against and along the surface 32, as shown in FIG. 4. The long, continuous pieces of wax removed from the surface 32 are easy to collect and dispose, in comparison to the numerous small chips and clumps of removed wax that typically result from the use of a wax comb.

The user can make additional passes over other portions of the surface 32, using the flat side surfaces 12, 14 of the body 11 for flat or slightly curved or contoured portions of the surface 32, and using the curved side surface 16 for more sharply curved or contoured portions of the surface 32 as shown in FIG. 5. The user can repeat the process of making a single pass over different paths on the surface 32, until the user has removed the wax layer 30 from all, or a portion of the surface 32.

Thus, the device 10, in a single pass, can efficiently and effectively remove the wax layer 30 along a path having a width about equal the length of the first side surface 12 (or the second and third side surfaces 14, 16). At the same time, the moderate hardness of the body 11 gives the body 11 sufficient flexibility and malleability to prevent the body 11 from scratching, dinging, and otherwise damaging the relatively delicate glossy surface 32 or the underlying fiberglass shell of the surfboard 34, and to allow the body 11 to conform to the contours of the surface 32 so that the wax layer 30 can be removed in a single pass, without a need to reorient the body 11 and make a second pass over the same path.

Also, the relative flexibility and pliability of the body 11 permit the body 11 to resiliently deform when encountering pebbles or other hard objects embedded in the wax layer 30, thereby preventing damage to the device 10 and providing the device 10 with the durability needed to achieve a relatively long service life. The thin, rigid, beveled leading edge or blade 102 of a wax comb, such as the wax comb 100, by contrast, often chips or dents when encountering hard objects, making the wax comb 100 less effective and limiting its service life. Also, unlike the rigid plastic from which a typical wax comb 100 is formed, the polyurethane material from which the body 11 of the device 10 is formed is well suited to withstand years of hard use, aggressive handling, and being dropped repeatedly.

The lack of sharp edges on the body 11, and the flexible polyurethane material from which the body 11 is formed make the device 10 comfortable to hold, reduce the potential for user fatigue and injury due to repeated use of the device 10, and otherwise provide the device 10 with favorable ergonomics. When using the wax comb 100, by contrast, the user typically needs to press against the side of the comb 100 opposite the side that is contacting the wax. Thus, the heel of the user's hand needs to contact and press against the sharp beveled edge, or the sharp teeth of the wax comb 100, often resulting in user fatigue and injury. Also, the device 10 generates little or no sound as the body 11 slides across the surface 32, unlike a wax comb 100 which typically generates an unpleasant scraping or screeching sound during use.

Thus, Applicant has found that a layer of hardened wax, such as the layer of used wax 30 on the surfboard 34, can be removed in an efficient and effective manner using a device 10 formed from a polymeric material with a hardness value low enough to permit the material to resiliently flex and bend when pushed against the wax, but high enough so that the hardness of the material, in combination with the blunt, continuous, and relatively thick leading edge of the device 10, e.g., the first side surface 12, and the relatively thick body 11, give the device 10 sufficient stiffness, strength, and integrity to lift and peel the relatively hard wax from the underlying surface. Also, the combination of flat and curved side surfaces 12, 14, 16 of the body 11, in conjunction with the flexibility of the body 11, optimize the device 10 for use on flat and slightly curved or contoured surfaces, as well as highly curved or contoured surfaces.

The relevant structural and functional characteristics of the device 10 thus stand in contrast to the conventional teachings regarding wax removal tools such the wax comb 100. The wax-removing surface of the wax combs typically consists of the thin edge or blade 102 that, to withstand the stresses normally encountered during wax removal, is formed from a relatively hard plastic with little or no flexibility and resilience. Thus, the blade 102 cannot bend or flex substantially to follow the contours of the underlying surface, making the wax comb 100 a less than optimal means for removing wax from the many curves and contours of a typical surfboard.

The use of the device 10 to remove wax from a surfboard is disclosed for illustrative purposes only. The device 10 can be used to remove wax from objects other than surfboards.

I claim:

1. A method for removing hardened wax adhered to a surface of a surfboard, comprising:

providing a wax removing device comprising a body formed from a polyurethane rubber material having a hardness between about Shore 70A and about Shore 90A, the body comprising:

a triangular top surface, a triangular bottom surface, a first side surface having a first edge adjoining the top surface, and a second edge adjoining the bottom surface, a second side surface having a first edge adjoining the top surface, and a second edge adjoining the bottom surface, and a curved third side surface having a first edge adjoining the top surface, and a second edge adjoining the bottom surface, wherein:

the first and second side surfaces are substantially planar, and the third side surface is curved inwardly, toward the body;

the respective first edges of the first, second, and third side surfaces define an entirety of a perimeter of the top surface and meet at no more than three end points thereof, and the respective second edges of the first, second, and third side surfaces define an entirety of a perimeter of the bottom surface and meet at no more than three end points thereof;

placing the second edge of one of the first, second, and third side surfaces in contact with the hardened wax;

tilting the body in relation to the surface of the surfboard; and exerting downward pressure on the body while moving the body along the surface of the surfboard, the downward pressure being sufficient to flex the body over curved or contoured portions of the surface of the surfboard thereby causing the body to conform to the curved or contoured portions of the surface of the surfboard and maintain in contact with the curved or contoured portions of the surface of the surfboard as the hardened wax is removed from the surface of the surfboard.

2. The method of claim 1, wherein:

placing the second edge of one of the first, second, and third side surfaces in contact with the hardened wax comprises placing the second edge of one of the first, second, and third side surfaces in contact with the hardened wax so that the bottom surface of the body faces the surface of the surfboard; and tilting the body in relation to the surface of the surfboard comprises angling the bottom surface of the body in relation to the surface of the surfboard.

3. The method of claim 2, wherein angling the bottom surface of the body in relation to the surface of the surfboard comprises angling the bottom surface of the body in relation to the surface of the surfboard by about 45 degrees.

4. The method of claim 1, wherein exerting downward pressure on the body while moving the body along the surface of the surfboard comprises exerting sufficient forward and downward pressure on the body to cause the body to peel the hardened wax from the surface of the surfboard.

5. The method of claim 1, wherein:

placing the second edge of one of the first, second, and third side surfaces in contact with the hardened wax comprises placing the second edge of the first side surface in contact with the hardened wax on a substantially flat portion of the surface of the surfboard.

6. The method of claim 1, wherein: placing the second edge of one of the first, second, and third side surfaces in contact with the hardened wax comprises placing the second edge of the third side surface in contact with the hardened wax on the curved or contoured portion of the surface of the surfboard.

7. The method of claim 6, wherein:

tilting the body in relation to the surface of the surfboard comprises tilting the body in relation to the surface of the surfboard while the second edge of the third side surface is in contact with the hardened wax on the curved or contoured portions of the surface of the surfboard; and exerting downward pressure on the body while moving the body along the surface of the surfboard comprises exerting the downward pressure on the body while moving the body along the curved or contoured portions of the surface of the surfboard and while the second edge of the third side surface is in contact with the hardened wax on the curved or contoured portions of the surface of the surfboard.

8. The method of claim 1, wherein the polyurethane rubber material has hardness of about Shore 90 A.

9. The method of claim 1, wherein the top and bottom surfaces are separated by a distance of about ⅜ inch to about ½ inch.

10. The method of claim 1, wherein a distance between the first and second edges of the respective first, second, and third side surfaces is about ⅜ inch to about ½ inch.

11. The method of claim 1, wherein:

placing the second edge of one of the first, second, and third side surfaces in contact with the hardened wax comprises placing the second edge of the first or the side surface in contact with the hardened wax on the substantially flat portion of the surface of the surfboard; and the method further comprises:

tilting the body in relation to the surface of the surfboard while the second edge of the first side surface is in contact with the hardened wax on the substantially flat portion of the surface of the surfboard, and exerting downward pressure on the body while moving the body along the substantially flat portion of the surface of the surfboard and while the second edge of the first or the second side surface is in contact with the hardened wax on the substantially flat portion of the surface of the surfboard.

12. The method of claim 1, wherein the first, second and third side surfaces are blunt and continuous and have a height between the bottom and top surfaces of at least about ⅜ inch.

* * * * *